Aug. 24, 1943.    M. P. MARONG    2,327,917
WINDSHIELD DEFROSTER ATTACHMENT
Filed Nov. 21, 1941    2 Sheets-Sheet 1
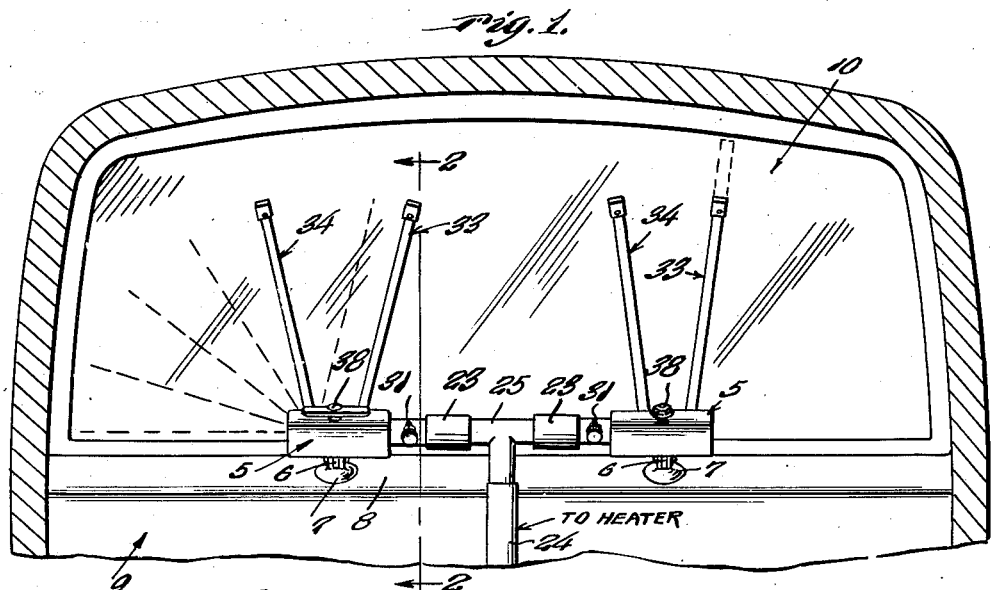
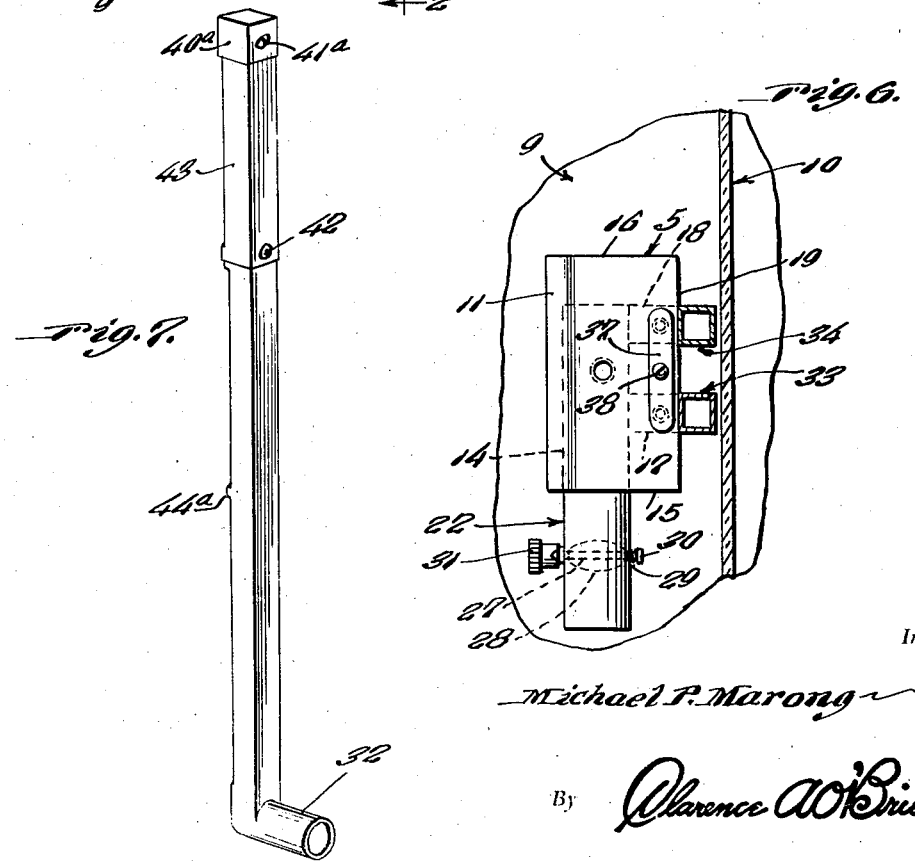
Inventor
Michael P. Marong
By Clarence A. O'Brien
Attorney

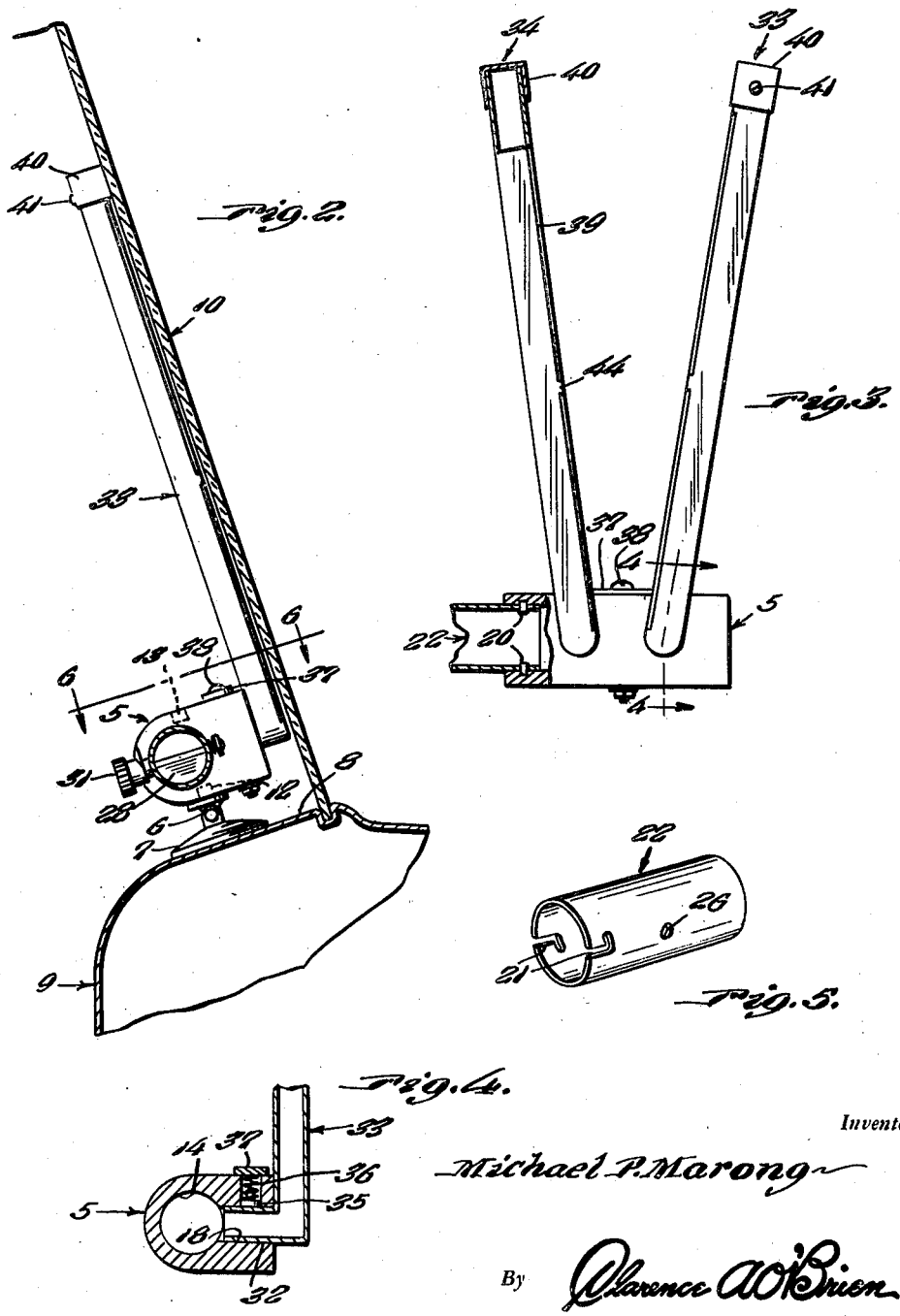

Patented Aug. 24, 1943

2,327,917

UNITED STATES PATENT OFFICE 2,327,917

WINDSHIELD DEFROSTER ATTACHMENT

Michael P. Marong, Warsaw, N. Y.

Application November 21, 1941, Serial No. 420,020

1 Claim. (Cl. 20—40.5)

My invention relates to improvements in means for defrosting the windshields of motor vehicles, and particularly to a defrosting arrangement which may be attached singly or in pairs to structure surrounding the windshield to be defrosted or selected portions thereof, whereby selected portions of the windshield may be defrosted at the will of the driver by adjustment of parts of the defrosting arrangement, and the primary object of my invention is to provide a simple and efficient arrangement of the character indicated.

Other important objects and advantages of my invention, will be apparent from a reading of the following description taken in connection with the appended drawings, wherein for purposes of illustration I have shown preferred embodiments of my invention.

In the drawings:

Figure 1 is a fragmentary transverse vertical sectional view taken through the driving compartment of an automobile looking toward the windshield and the instrument panel thereof, and showing a dual arrangement in accordance with the present invention detachably mounted on the instrument panel.

Figure 2 is an enlarged fragmentary transverse vertical sectional view taken through Figure 1 along the line 2—2 and looking toward the left in the direction of the arrows.

Figure 3 is an elevational view of a single arrangement in accordance with the present invention, partly broken away to show internal structure.

Figure 4 is a fragmentary transverse vertical sectional view taken through Figure 3 along the line 4—4 looking toward the right in the direction of the arrows.

Figure 5 is a perspective view of one of the valved heater hose adapters.

Figure 6 is a fragmentary horizontal sectional view taken through Figure 2 along the line 6—6 and looking downwardly in the direction of the arrows.

Figure 7 is a perspective view of a modified form of defroster arm having a telescopically extensible construction enabling desirably lengthening or shortening the arm to reach to different portions of the windshield to be defrosted.

Referring in detail to the drawings, the numeral 5 generally designates the body characterizing each arrangement in accordance with the present invention, the body being generally elongated rectangular in form and cross section and made of plastic, metal, or other suitable material, with a bracket 6 projecting from the middle or other suitabale place on its underside or bottom, and equipped with a suction cup 7 to enable relatively securely mounting the body 5 on a selected portion of the upper part 8 of the instrument panel 9 of the automobile to the rear of the windshield 10. For appearance and for avoidance of sharp corners the front longitudinal side of the body 5 may be rounded as indicated by the numeral 11. The bracket 6 involves a threaded shank 12 threadable in either the upper or lower sockets 13 formed in the top and bottom, respectively, of the body 5 as indicated in Figure 2 of the drawings, in accordance with the position in which the body 5 is mounted. Obviously, in the dual arrangement shown in Figure 1 of the drawings, one of the bodies must be obverted to achieve the desired position, and in this case, the suction cup brackets are changed in position. The brackets 6 are desirably of hinged character to enable adequate adjustment of the body in accordance with the angulation of the windshield 10.

A preferably although not necessarily cylindrical hot air passage 14 is formed in the body 5 from the end 15 thereof to within a certain distance of the opposite end 16 thereof, the passage 14 being located nearer the rear or rounded side 11 of the body, with longitudinally spaced lateral branches 17 and 18 leading from the passage 14 through the front side 19 of the body. The outer end of the passage 14 is provided with bayonets 20 which are engageable with bayonet slots 21 formed in the inner end of the valved adapter which is generally designated 22 and which is arranged to be suitably coupled as indicated at 23 to the hot air pipe 24 leading from the heater or other source of defrosting air. In the case of the single arrangement, the coupling 23 would directly connect the pipe 24 with the adapter 22. However, in the dual arrangement shown in Figure 1 of the drawings, a T-fitting 25 is applied, with the vertical arm of which the pipe 24 is connected, the ends of the cross arm being connected by couplings 23 with the adapters 22, so that both defrosting arrangements are properly supplied with hot defrosting air from the pipe 24.

The adapter 22 is provided with diametrically opposed holes 26 which receive a bolt or shaft 27 on which is secured a butterfly valve 28 which is adapted to be positioned across the bore of the adapter 22 to partially or wholly shut off the passage of defrosting air therethrough, and thereby control the defrosting action of the attachment. A coil spring 29 may be disposed on the shaft 27 between a stop 30 and the side of the adapter to give desired retaining tension to the bolt or shaft, and the opposite end of the shaft is provided with an operating knob 31 having suitable indicating means to show the position of the valve in the adapter.

The branch passages 17 and 18 are substantially cylindrical in form to rotatably receive the cylindrical right angular terminals 32 on the lower ends of the rectangular cross section defroster arms 33 and 34, respectively. Frictionally engaging the tops of the cylindrical terminals 32 is a disk or button 35 having a conformably shaped under surface to avoid abrading the terminal 32, the element 35 being pressed downwardly by a spring 36 compressed by a vertically adjustable cross member 37 which is adjustable relative to the body 5 by a bolt 38 which traverses the middle of the cross member and threads into the body 5 between the passage branches 17 and 18 as particularly well indicated in Figures 4 and 6. By adjusting the bolt or screw 38 the pressure of the disks 35 on the terminals of the defroster arms may be adjusted to either free the arms for adjustment or to lock the same in adjusted position.

The defroster arms comprise preferably rectangular cross section tubes with longitudinal slots 39 formed in the forward and inward corners thereof, whereby the defrosting air escaping through these slots is directed toward the inner side of the windshield 10 in front of the arms and laterally toward each other, with respect to the defrosting arms. In one form of the defrosting arm the upper end is provided with a cap 40 held in place by a set screw 41. In another form of defroster arm the body of the arm is telescopic in form, the sections being arranged to be clamped in adjusted relation by a set screw 42 as indicated in Figure 7 of the drawings, the cap 40a in this arrangement being placed on the upper section 43 and held in place by a set screw 41a, so that the arm can be lengthened to reach and traverse any desired portion of the windshield to the extent that the arm is capable of reaching. As indicated in the drawings lugs 44 may reach across the slot 39 at suitable intervals to keep the tubes from spreading.

Although I have shown and described herein the preferred embodiments of my invention, it is to be understood that I do not wish to limit the application of the invention thereto except as may be required by the scope of the subjoined claim.

Having described the invention, what is claimed as new is:

A windshield defroster for attachment on top of the instrument panel of an automobile and connection to a hot air pipe upstanding alongside the central portion of said panel, said defroster comprising an elongated substantially rectangular hollow block having open and closed ends, respectively, the open end forming an inlet for hot air, and said block having a pair of longitudinally spaced apertures in one side thereof, means to attach said block to said panel upon opposite sides of said pipe, selectively, with said open end facing said pipe and said apertured side facing said windshield, a pair of tubular slotted defroster arms having right angled hot air inlet ends journaled in said apertures, respectively, for swinging adjustment of said arms into upstanding position relative to said block and alongside said windshield when the block is attached upon either side of said pipe, means to connect the open end of said block to said pipe from either side of the pipe, and releasable means carried by said block to frictionally lock said right angled ends of said arms in said pair of apertures.

MICHAEL P. MARONG.